United States Patent Office 3,177,616
Patented Apr. 13, 1965

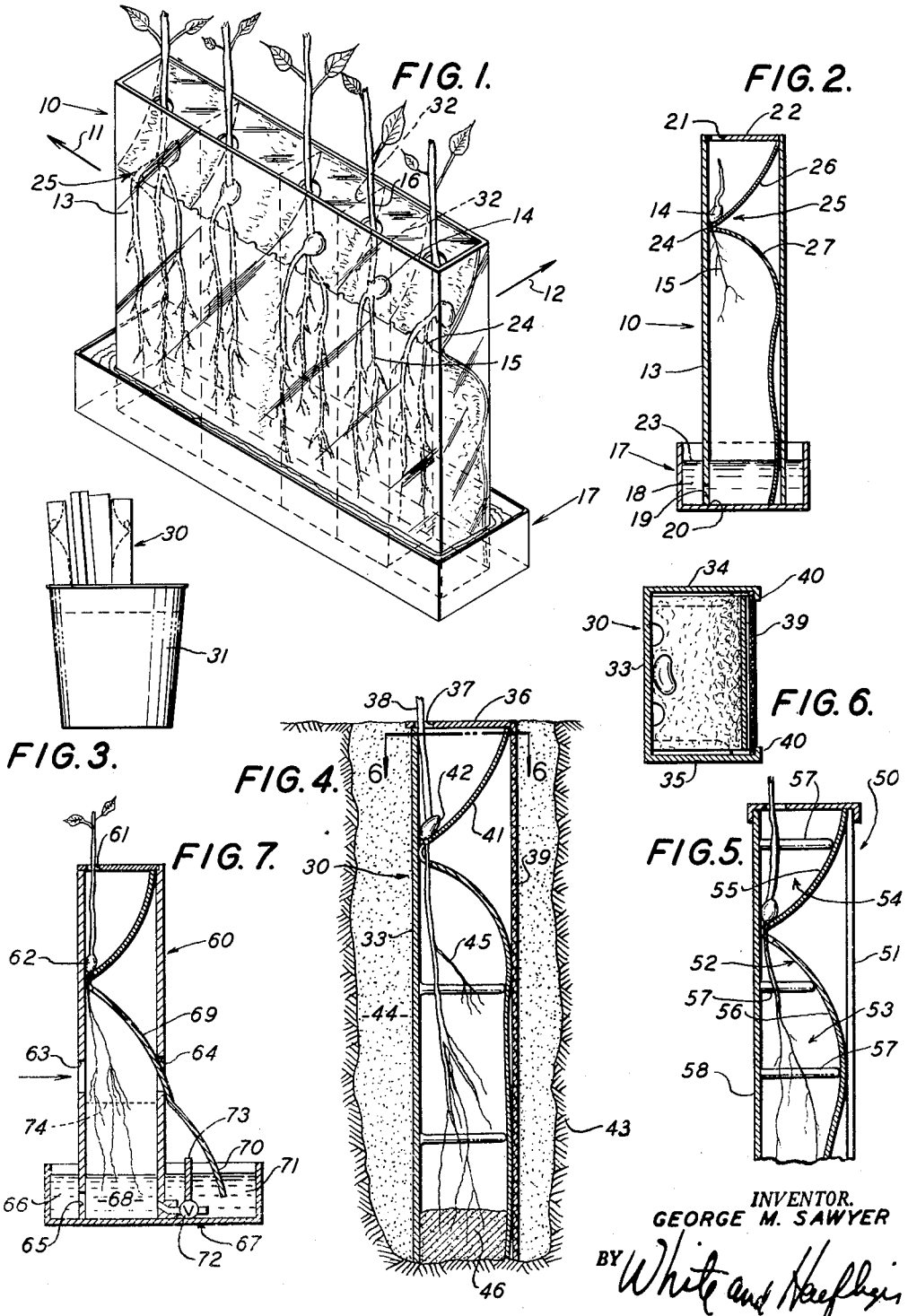

3,177,616
SEED GROWTH KITS
George M. Sawyer, 4117½ Mildred Ave.,
Los Angeles, Calif.
Filed Aug. 28, 1961, Ser. No. 134,495
10 Claims. (Cl. 47—1.2)

This invention relates generally to seed growth starting apparatus or kits, and more particularly has to do with novel apparatus facilitating transplanting, without damage, of young plants which have sprouted from seeds germinated by or in such apparatus.

The invention represents an improvement over the typical embodiments subject matter description in my prior application "Seed Growth Display Apparatus," Serial No. 789,169, and filed January 26, 1959, now U.S. Patent 2,993,300. For example, in its broad aspects the invention contemplates the provision of an assembly including a shell having upper and lower openings with means in the shell to support a seed at an elevation lower than the upper opening and to supply moisture to the supported seed. The arrangement of openings is such in relation to the seed supporting and moisture supplying means that the shell is adapted to be placed in a water container with the upper opening above water level, and the moisture supply means typically includes moisture absorbent material adapted to contact both the supported seed and container water which enters the shell through the lower opening. Further, the shell typically is sufficiently transparent to permit exterior viewing of seed roots growing downwardly within the shell and through an aperture formed in sheet-like moisture absorbent material which may be provided, it being contemplated that other types and forms of absorbent material serving the same functions may be provided.

Another object of the invention includes the provision of a vertically elongated or pipe-like shell, comprising what may be characterized as a "growth stick" and readily adapted for transplanting a young plant. Thus, the shell may typically, but not necessarily, have a side opening or slot through which solids such as earth fill may enter the shell for ultimate nourishment of the seed roots, as will occur upon transplanting of the young plant at least partially contained within the shell. The moisture absorbent material may then be supported within the shell to block such entrance of the earth fill as would otherwise crush seed roots in the shell, thereby preventing the commonly occurring delay in plant growth resulting from damage to seed roots upon transplanting. Such "growth sticks" also facilitate automated transplanting, inasmuch as the shell being relatively rigid is adapted to machine handling, all without damage to the young plant within the shell.

A further object of the invention includes the provision of a shell structure which is horizontally elongated in one direction, the shell being relatively narrow in a second horizontal direction normal to the first direction, whereby seeds may be spaced apart in a row in said first horizontal direction, and a row of seed roots may be viewed from the exterior. Here again, the shell may be placed downwardly within a water tray structure so that water in the tray may contact the absorbent material which will wet the seeds.

These and other objects and advantages of the invention, as well as the details of an illustrative embodiment, will be more fully understood from the following detailed description of the drawings, in which:

FIG. 1 is a perspective view of one form of the seed germinating apparatus;
FIG. 2 is a vertical section taken through the FIG. 1 apparatus;
FIG. 3 shows a number of "growth sticks" standing within a water container;
FIG. 4 is an enlarged vertical section through a growth stick shell containing a young plant transplanted with the shell to the ground;
FIG. 5 is a fragmentary vertical section through another form of growth stick shell having a slotted side;
FIG. 6 is a horizontal section taken through the FIG. 4 growth stick on line 6—6 thereof; and
FIG. 7 is a vertical section through a modified growth stick shell.

In FIG. 1 a transparent plastic shell is shown at 10 as having vertical elongation, the shell being horizontally elongated in the direction of the arrow 11, and being relatively narrow in the second horizontal direction indicated by the arrow 12. Although the shell is shown as entirely transparent, it is contemplated that it needs only to be sufficiently transparent, as for example at side wall 13, as to permit exterior viewing of seeds 14, seed roots 15 and stems 16, or any one of these, within the shell. The latter is shown as placed downwardly within water container means 17, typically in the form of a water tray structure conforming generally to the horizontal extent of the shell, but sufficiently large as to permit downward placing of the shell therein.

Referring to FIG. 2, the tray structure 17 contains water 18 which may enter the shell through a lower opening 19 therein, that opening being typically but not necessarily formed in the side wall 13 or endwall of the shell. In addition, or alternately, it may be sufficient that the open bottom 20 of the shell will admit water therein for purposes to be described. The shell in FIG. 2 is shown to contain means for both supporting a seed 14 and for supplying moisture to the supported seed. Such means may typically include liquid absorbent material such as cellulose or an ordinary ink blotter extending within the shell to serve the supporting and moistening functions. As regards the supporting function, the seed is shown carried at an elevation lower than an upper opening 21 in a top wall or lid 22 for the shell, and well above the lower opening 19, so that the seed is supported at well above the upper surface level 23 of hydroponics liquid, or water, within the tray structure 17. Other equivalent means for so supporting the stem may be used. Further, the seed 14 is shown approximately directly below the opening 21 so that the seed stem may grow upwardly through that opening and be supported laterally against toppling down. Seed roots 15 grow downwardly through suitable apertures 24 formed in the seed support means; which is indicated generally at 25.

The sheet-like support means shown in FIG. 2 includes a first portion 26 extending downwardly and laterally to an intermediate terminal location adjacent the inner face of the wall 13, and a second portion 27 extending from the first portion generally downwardly. Typically, the second portion 27 extends downwardly into the liquid 23 within the shell so as to soak up the liquid and moisten the seed 14 for germination purposes. Such liquid may comprise water, or water to which has been added chemical or other nutrients, as are well known to horticulturists.

At such time as the stems have grown upwardly through the openings 21, and the roots have grown downwardly as for example to penetrate the liquid 18, the young plant or plants may be considered ready for transplanting to the soil. Such transplanting is very easily accomplished merely by lifting the shell 10 from the tray structure 17 and inserting the shell downwardly into a hole dug in the earth, after which the hole is back filled to support the shell structure in a vertical condition. It is emphasized that such transplanting does not in any way damage the fragile roots 15 since they are protected within the shell, and therefore the plant may continue to grow without interruption such as is commonly caused by damage to the roots upon transplanting.

FIG. 3 shows a number of what may be termed "growth sticks" 30 standing within a water container 31 in order to start germination. Each of the growth sticks may have the shape or structure of one section of the FIG. 1 shell, a typical section being formed as indicated by the broken line boundaries 32. More specifically, FIG. 4 shows a growth stick 30 characterized as having transparent vertical walls 33, 34 and 35 at three sides of the shell, and an optional top wall 36 containing an opening 37 to pass the plant stem 38. Walls 33–35 need not be transparent.

The fourth wall 39 may be formed of readily decomposable or porous material such as burlap, cardboard, or the like, that wall being suitably retained as by means of the turned-over edges 40 integral with walls 34 and 35 as shown in FIG. 6. The sheet-like absorbent material 41 within the shell has the general shape of the corresponding material 25 in FIG. 2, and it supports a seed 42 adjacent the wall 33 as illustrated in FIG. 4. When the growth stick is transplanted into the ground 43, the back fill earthy material 44 will after a short time penetrate through the wall 39 as for example through the porous structure of the wall, or as a result of decomposition of the wall, all for the purpose of reaching the roots 45 which are protected within the shell. Also, a certain amount of such earthy material may penetrate upwardly through the open bottom of the shell as shown in FIG. 4 at 46 upon the initial transplant, so as to be readily accessible to the downwardly growing roots.

Referring now to FIG. 5, the illustrated shell 50 has an open side at 51 through which earthy material may penetrate when the shell is inserted into the ground. The earthy material may then come in contact with the sheet-like liquid absorbent means 52; however, the seed roots will remain protected in the zone 53, and the seed stem will remain protected in the zone 54 since the upper and lower portions 55 and 56 of the sheet 52 are positioned against leftward collapse by means of the ribs or projections 57. The latter project rightwardly from the shell wall 58 to block leftwardly collapse of the sheet 52. It will also be understood that other means may be used in place of the projections 57 so long as such means serve the function of the projections. The sheet 52 being subject to decomposition, it is clear that the seed roots will ultimately be contacted by earthy material as the latter penetrates through the sheet.

Finally, reference is made to FIG. 7 in which a shell 60 is shown having an upper opening 61 for the stem of the seed 62, and having a series of lower side openings 63, 64 and 65. The latter opening is adapted to pass liquid 66 within the container means 67 into the lowermost interior of the shell at 68, and the seed roots may upon downward growth be received within such liquid.

Side openings 64 are adapted to pass the lower portion 69 of the sheet-like liquid absorbent material, the lower terminal end 70 of which is received within the liquid body 71 external to the shell 60. In aqueous solution the liquid bath 71 may have a different composition than bath 68, and may be particularly suited to initial germination of the seed, whereas bath 68 may be particularly suited to later growth of the plant as occurs when the seed roots penetrate that bath. On the other hand, the liquid baths 68 and 71 may have the same composition, and there may be ready communication through a valve 72 through the container partition 73.

Finally, side opening 63 may be used for introducing dirt or other fill material into the shell interior, as for example to a level 74, in the event it is desired that the seed roots have a chance to penetrate solid moistened material as they grow downward. It is clear that such earthy material may be filled into the shell without disturbing the function of the sheet-like material 69 to moisten the seed to initiate such germination.

I claim:

1. Seed germinating apparatus, comprising an assembly including a shell having upper and lower openings and adapted to be placed in a water container so that said upper opening is above water level and said lower opening is below water level to admit water into the lowermost interior of the shell, and means within the shell to support a seed at an elevation position characterized as lower than said upper opening and always in direct open communication with the shell at said elevation as well as with said openings through the upper and lower interiors of the shell and for supplying moisture to the supported seed; said means including liquid absorbent material adapted to be contacted by both the seed and container water which enters the shell through said lower opening, said absorbent material being in sheet form and including a first portion extending to form said seed support means at said elevation and at a terminal location adjacent one interior wall of said shell and a second portion extending downwardly from said first portion toward the opposite interior wall of said shell, said sheet form material containing at least one aperture for said direct open communication with the lower interior of the shell and through which seed roots may grow downwardly from the seed.

2. The apparatus of claim 1 in which the shell is vertically elongated and sufficiently transparent both above and below said location as to permit exterior viewing of the seed, roots extending downwardly from the seed and stem extending upwardly from the seed.

3. The apparatus of claim 2 in which said upper and lower openings are at the top and bottom of the shell respectively to establish along with said aperture a generally vertically open condition throughout the shell for reception of the seed stem and roots.

4. The apparatus of claim 2 in which the shell is also elongated in a first horizontal direction, the shell being relatively narrow in a second horizontal direction normal to said first direction, said assembly forming another aperture spaced from said one aperture in said first direction.

5. The apparatus of claim 3 including a water tray structure in which the shell is downwardly received so that water in the tray may contact said absorbent material.

6. The apparatus of claim 1 in which the shell is vertically elongated and forms a vertical slot extending laterally through one side of the shell spaced from the seed support location for reception of solids entering the shell interior ultimately to nourish the seed roots.

7. The apparatus of claim 6 in which said moisture absorbent material is sheet-like and the shell contains structure for supporting said material to block entrance of said solids which would otherwise crush seed roots within the shell.

8. The apparatus of claim 2 in which said upper and lower openings are at the top and side of the shell respectively.

9. Seed germinating apparatus, comprising an assembly including a shell having upper and lower openings and adapted to be placed in a water container so that said upper opening is above water level and said lower opening is below water level to admit water into the lowermost interior of the shell, and means within the shell to support a seed at an elevation position characterized as lower than said upper opening and always in direct open communication with the shell at said elevation as well as with said openings through the upper and lower interiors of the shell and for supplying moisture to the supported seed, said means including liquid absorbent material adapted to contact both the seed and container water which enters the shell through said lower opening said absorbent material being in sheet form and including a first portion extending downward of and laterally to a terminal location adjacent one interior wall of said shell and a second portion extending downwardly from said first portion, said sheet form material containing at least one aperture through which seed roots may grow downwardly from a seed support region directly above first portion and near said terminal location.

10. Seed germinating apparatus, comprising an assembly including a shell having upper and lower openings and adapted to be placed in a water container so that said upper opening is above water level and said lower opening is below water level to admit water into the lowermost interior of the shell, and means within the shell to support a seed at an elevation position characterized as lower than said upper opening and always in direct open communication with the shell at said elevation as well as with said openings through the upper and lower interiors of the shell and for supplying moisture to the supported seed, said means including liquid absorbent material adapted to contact both the seed and container water which enters the shell through said lower opening said lower opening being in the side of the shell, the shell containing a side opening through which said moisture absorbent material extends to make contact with water in the container.

References Cited by the Examiner
UNITED STATES PATENTS

| | | | |
|---|---|---|---|
| 940,167 | 11/09 | Lacy | 47—14 |
| 1,063,742 | 6/13 | Schultz | 47—16 |
| 1,644,895 | 10/27 | Roberts | 47—14 |
| 1,648,309 | 11/27 | Isaacs | 47—16 |
| 2,026,322 | 12/35 | Raines | 47—1.2 |
| 2,431,063 | 11/47 | McGahey | 47—14 |
| 2,863,259 | 12/58 | Radford | 47—38.5 |
| 2,993,330 | 7/61 | Sawyer | 47—1.2 |

FOREIGN PATENTS

| | | |
|---|---|---|
| 736,078 | 9/32 | France. |
| 8,767 | 1909 | Great Britain. |

T. GRAHAM CRAVER, *Primary Examiner.*

A. JOSEPH GOLDBERG, *Examiner.*